United States Patent [19]

Crabb

[11] Patent Number: 4,822,421
[45] Date of Patent: Apr. 18, 1989

[54] THIXOTROPIC CEMENT COMPOSITIONS

[75] Inventor: Clarence R. Crabb, Midland, Mich.

[73] Assignee: The Dow Chemical Company, Midland, Mich.

[21] Appl. No.: 164,156

[22] Filed: Mar. 4, 1988

[51] Int. Cl.$^4$ ................................................ C04B 7/02
[52] U.S. Cl. ..................................... 106/89; 106/104; 106/314; 106/315
[58] Field of Search ................... 106/89, 314, 315, 104

[56] References Cited

U.S. PATENT DOCUMENTS

| | | | |
|---|---|---|---|
| 3,804,174 | 4/1974 | Chatterji et al. | 106/93 |
| 3,847,635 | 11/1974 | Lange et al. | 106/89 |
| 3,959,003 | 5/1976 | Ostroot et al. | 106/93 |
| 4,235,291 | 11/1980 | Messenger | 106/85 |
| 4,415,367 | 11/1983 | Nelson | 106/89 |
| 4,524,828 | 6/1985 | Sabins et al. | 106/93 |
| 4,664,843 | 5/1987 | Burba, III et al. | 252/315.5 |

OTHER PUBLICATIONS

Ser. No. 166,955, filed Mar. 11, 1988.

*Primary Examiner*—William R. Dixon, Jr.
*Assistant Examiner*—Anthony Green
*Attorney, Agent, or Firm*—Paula Sanders Ruhr

[57] ABSTRACT

An aqueous composition comprising cement and a mixed metal layered hydroxide which demonstrates thixotropic properties. The mixed metal layered hydroxide is essentially monolayer. An example of such a layered hydroxide useful in this composition is magnesium aluminum hydroxychloride. These cement compositions are thixotropic and shear thinning, harden without settling and do not dewater upon standing.

13 Claims, No Drawings

THIXOTROPIC CEMENT COMPOSITIONS

BACKGROUND OF THE INVENTION

The present invention relates to thixotropic cement compositions.

Thixotropic cement is a cement slurry which will develop a low viscosity in turbulent flow or upon agitation, but which exhibits a high viscosity upon setting. This transition is reversible when the shear or agitation is removed. Cements having thixotropic characteristics have a wider application of usage than those lacking this characteristic. Thixotropic cement compositions have utility in situations where it is desirable to pump the cement to the point of application and yet have the cement exhibit the characteristics of a still cement mortar when in use. Two examples of such situations are patching roadways having a steep incline and applying key grouting and floor filling. In each of these situations, it is desirable to pump the cement to the point of application and yet have the cement remain in place once it is positioned.

Thixotropic cement compositions are known. U.S. Pat. Nos. 3,959,003 and 3,804,174 disclose a cementing composition for oil and gas wells in which a complex formed by the reaction of a salt of a polyvalent metal with a water-soluble cellulose ether is used as an additive to impart thixotropic properties to the cement. U.S. Pat. No. 3,847,635 teaches that cementitious mixtures of alpha calcium sulfate hemihydrate, portland cement and a dispersing agent are rendered thixotropic by the addition of a small amount of crystallized magnesium sulfate. A thixotropic cement composition comprising water, hydraulic cement, a titanium chelate cross-linking agent and a water-soluble cross-linkable resin such as cellulose ether is disclosed in U.S. Pat. No. 4,524,828. U.S. Pat. No. 4,415,367 discloses that cement slurries comprising iron (II) sulfate, aluminum sulfate, a hydraulic cement and water are pumpable and thixotropic.

Existing thixotropic cement compositions do not possess all the characteristics needed for various applications. Thus, thixotropic cement compositions which are very shear thinning, which maintain their shape when at rest and which do not result in the separation of water from the composition upon standing are needed.

SUMMARY OF THE INVENTION

The present invention is such a thixotropic cement composition comprising cement and a mixed metal layered hydroxide, in an amount effective to thicken and render thixotropic said cement composition when said composition is mixed with water, wherein the crystals of the mixed metal layered hydroxide are essentially monolayer. By monolayer, it is meant that there is only one layer of the mixed metal hydroxide per unit cell.

It is surprising that the thixotropic cement composition of this invention results in a cement that is thixotropic, that maintains its shape when at rest and that hardens without significant separation of water.

The thixotropic cement composition of this invention has various utilities. These include use in oil and gas wells; use in construction of roads and buildings; and use as tile mortar or sprayed mortar.

DETAILED DESCRIPTION OF ILLUSTRATIVE EMBODIMENTS

The mixed metal layered hydroxide functions as a thickener and imparts thixotropic properties to the cement composition of this invention. The use of the mixed metal layered hydroxide results in a cement slurry that is thixotropic and in which there is no significant separation of water or settling when the slurry is at rest.

The mixed metal layered hydroxides useful in this invention are crystals possessing an essentially monolayer structure. That is, the crystals exist with essentially one layer of mixed metal hydroxide per unit cell. When in a liquid carrier, the mixed metal layered hydroxide is monodispersed meaning that they exist as individual crystals. It is preferred to use mixed metal layered hydroxides having the empirical formula $Li_m D_d T(OH)_{(m+2d+3+na)} A_a^n$, where m is the number of Li ions in the formula;
D represents at least one divalent metal ion;
d is the number of D ions;
T represents a trivalent metal ion;
A represents a monovalent or polyvalent anion other than OH;
a is the number of ions of A in the formula:
n is the valence of A;
na is the product (n)(a) and is from -3 to zero; and
(m+2d+3+na) is equal to or greater than 3.

The value of m is preferably from about zero to 1 with the proviso that when d is zero, m is not zero. When m is not zero, it is preferred that m is at least about 0.5 and no greater than about 0.75.

The divalent metal ions represented by D are preferably Mg, Ca, Ba, Sr, Mn, Fe, Co, Ni, Cu, Zn or mixtures of these. It is more preferred that D is Mg, Ca or mixtures of Mg and Ca. It is most preferred that D is Mg.

The value of d is preferably from zero to about 4 with the proviso that when m is zero, the value of d is at least 1. More preferably, d is at least about 1 and no greater than about 3 and most preferably is about 1.

The trivalent metal ion represented by T is preferably Al, Ga, Cr or Fe and more preferably Al or Fe. It is most preferably Al.

The anions represented by A may be monovalent, divalent, trivalent or polyvalent and they may be inorganic or hydrophilic organic ions. Illustrative examples of inorganic anions include halide, sulfate, nitrate, phosphate and carbonate ions. Halide, sulfate, phosphate or carbonate ions are preferred. Illustrative examples of hydrophilic organic anions include glycolate, lignosulfonate, polycarboxylate or polyacrylate ions. These anions often are the same as the anions which form part of the metal compound precursors from which the mixed metal layered hydroxide crystals are formed. In a preferred embodiment, the salt used is $MgAl(OH)_x Cl_y$ where x is from about 4.5 to about 5 and y is from about 0 to about 0.5 with the proviso that the sum of x and y is 5.

The mixed metal layered hydroxides are preferably prepared by an instantaneous coprecipitation wherein soluble compounds, e.g., salts, of the metals are intimately mixed (using non-shearing agitation or mixing) with an alkaline material which supplies hydroxyl groups to form the mixed metal hydrous oxide crystals such as described in U.S. Patent 4,664,843, the teachings of which are hereby incorporated by reference. As stated above, the crystals are essentially monolayer, or one layer of the mixed metal hydroxide per unit cell. In a liquid carrier they are monodispersed meaning that individual crystals are distinct layers of the mixed metal hydroxide.

It will be understood by one skilled in this art that the mixed metal layered hydroxides of this inventions will be expected to have waters of hydration accompanying them unless driven off by elevated temperatures of at least about 100° C.

The amount of mixed metal layered hydroxide used in this thixotropic cement composition is any which will thicken the composition when mixed with water and will impart the desired properties to it. It is preferred that the amount of mixed metal layered hydroxide used is at least about 0.1 weight percent based on the total weight of the composition and no greater than about 7.5 weight percent. It is more preferred that the amount of mixed metal layered hydroxide are present in the composition at a level of at least about 0.5 weight percent and no greater than about 5.0 weight percent. The remainder of the composition is cement, additional additives, if any and filler, if any, and water.

The cement used in the thixotropic cement compositions of this invention may be any cement which will thicken and demonstrate the desired thixotropic and other properties upon the addition of the mixed metal layered hydroxide. The cement to be used will be selected by one skilled in the art based on the use to which the cement will be put. Preferably, a hydraulic cement will be used. Hydraulic cements are a known class of compounds, any member of which may be used herein. Of the hydraulic cements, it is more preferred to use Portland cements. Included within the Portland cement classification are those listed as Class A, B, C, G, and H by the American Petroleum Institute (API). Such cements are predominantly calcium oxide and silicon dioxide with minor amounts of iron oxide, aluminum oxide, magnesium oxide, sulfur trioxide and so on. The chemical compounds found in set Portland cements include tricalcium aluminate, dicalcium silicate and tetracalcium aluminoferrite. Other types of cement that are useful in the practice of this invention include air entraining cements useful, for example, in concrete pavements subjected to freezing and thawing; oil well cements useful in oil field applications; masonry cements and others.

Depending on the intended use of the thixotropic cement composition, sand, gravel or other fillers may be added to the composition. Other conventional additives may also be included in the cement compositions so long as they do not adversely affect the properties obtained by the use of the mixed metal layered hydroxide. Non-limiting examples of such conventional additives include retarders or accelerators to slow or speed the rate of cure and surfactants to aid in the preparation of foamed cement. The selection of such additives is within the skill of the art and will vary depending upon the particular use intended for the cement composition.

The relative proportions of cement, filler, additives (other than the mixed metal layered hydroxide) and water used in the thixotropic cement compositions of this invention may vary depending upon the intended use of the cement and the particular components. While more or less water may be used depending on the particular application, preferably from about 25 to about 60 weight percent of water based on the dry weight of the cement will be used.

The cement composition may be prepared by methods known in the art. The mixed metal layered hydroxide may be added as the cement slurry is prepared or may be added to a prepared slurry. The hydroxide may be added in dry form or may be added as a liquid dispersion in water. Thus, the composition of this invention may be a dry blend of cement and the mixed metal layered hydroxide and any additional additives or it may be the slurry containing the cement, the mixed metal layered hydroxide, any additional additives, filler, if any, and water.

The following illustrative examples are presented to exemplify the invention and should not be considered in any way limiting. Unless stated otherwise, all parts and percentages are given by weight.

EXAMPLE 1

A 122-gram portion of Portland I cement is mixed with 366 grams of water. The slurry is thickened by the addition of 10.1 grams of $MgAl(OH)_{4.7}Cl_{0.3}$. The resulting slurry is very shear thinning and may be sprayed. A 0.75-inch layer is sprayed on a vertical concrete surface with no sagging.

EXAMPLE 2

A mixture is prepared by mixing 50 grams of Portland I cement, 50 grams of fine sand, 30 grams of water and 30 ml of an 8.5 percent dispersion of $MgAl(OH)_{4.7}Cl_{0.3}$ in water in the order stated. The resulting slurry is thixotropic and clings to a vertical surface with no sag.

EXAMPLE 3

A mortar is prepared by mixing 50 grams of Portland I cement, 50 grams of sand and 22 grams of water. A 2.0-gram portion of $MgAl(OH)_{4.7}Cl_{0.3}$ is added and the mortar becomes very thick. An additional 7 grams of water is added to thin the mortar. The resulting mortar is easily workable and thixotropic. The composition is shaped into well-defined points and creases and is allowed to set for about 60 hours. It dries with no sagging or settling. The sharp points and creases are unchanged.

EXAMPLE 4

A 412-gram portion of Portland I cement is mixed with 250 grams of water and 5 grams of magnesium aluminum hydroxychloride ($MgAl(OH)_{4.7}Cl_{0.3}$). This mixture is easily stirred and maintains its shape when at rest. When the sample is left at rest, no water separates and comes to the surface. The sample is measured for rheological properties using a Fann 35 viscometer. While the sample thins when a shear force is applied, the viscosity of the sample returns to its original high value within about one second or less when the shear is discontinued. The results obtained are presented in Table I below.

COMPARATIVE EXAMPLE C-1

Example 4 is repeated with the exception that no magnesium aluminum hydroxychloride is included. This sample does not maintain its shape when at rest and small amounts of water come to the surface of the sample when it is left standing. This sample is also measured for rheological properties using a Fann 35 viscometer. The results obtained are presented in Table I below.

TABLE I

| Viscometer Reading (RPM) | Shear Rate (sec$^{-1}$) | Ex. 4 Viscosity with MgAl(OH)$_{4.7}$Cl$_{0.3}$ (centipoise) | Ex. C-1 Viscosity without MgAl(OH)$_{4.7}$Cl$_{0.3}$ (centipoise) |
|---|---|---|---|
| 3 | 5.1 | 4000 | 1800 |
| 6 | 10.2 | 2450 | 1250 |
| 100 | 170 | 189 | 195 |
| 200 | 340 | 105 | 125 |
| 300 | 510 | 77 | 98 |
| 600 | 1020 | 47 | 72 |

The above examples demonstrate that the cement composition of this invention has the desirable properties of thinning under the influence of shearing or agitation; returning to its original viscosity when the stress is removed, and having sufficient viscosity to maintain its shape when left at rest prior to hardening. Further, water does not separate from the cement composition upon standing. The data in Table I and in Comparative Example 1 demonstrates that cement compositions not including the mixed metal layered hydroxide have a substantially lower viscosity than those with the mixed metal layered hydroxide at low shear rates and a higher viscosity at high shear rates. Further, the data in Comparative Example 1 shows that cement compositions without the mixed metal layered hydroxide lack the other desirable properties of the compositions of this invention.

What is claimed is:

1. A thixotropic cement composition comprising a hydraulic cement and an effective amount of an additive to thicken and impart thixotropic properties to said cement composition upon the addition of water, the additive consisting essentially of a mixed metal layered hydroxide wherein the crystals of the hydroxide are essentially monolayer.

2. The composition of claim 1 wherein the mixed metal layered hydroxide is represented by the following formula:

$$Li_m D_d T(OH)_{(m+2d+3+na)} A_a^n,\text{ where}$$

m is the number of Li ions in the formula;
D represents divalent metal ions;
d is the number of D ions;
T represents a trivalent metal ion;
A represents monovalent or polyvalent anions other than OH;
a is the number of ions of A in the formula;
n is the valence of A;
na is from zero to $-3$; and
$(m+2d+3+na)$ is equal to or greater than 3.

3. The composition of claim 2 wherein m is zero.

4. The composition of claim 3 wherein D is Mg, Ca or mixtures of Mg and Ca.

5. The composition of claim 4 wherein D is Mg.

6. The composition of claim 5 wherein d is about 1.

7. The composition of claim 2 wherein T is Al, Ga, Cr or Fe.

8. The composition of claim 7 wherein T is Al.

9. The composition of claim 1 wherein the mixed metal layered hydroxide is MgAl(OH)$_x$Cl$_y$ wherein x is from about 4.5 to about 5.0 and y is from about 0 to about 0.5 with the proviso that the sum of x and y is 5.

10. The composition of claim 1 wherein the mixed metal layered hydroxide is MgAl(OH)$_{4.7}$Cl$_{0.3}$.

11. The composition of claim 1 wherein the mixed metal layered hydroxide constitutes at least about 0.1 weight percent based on the total weight of the composition and no more than about 7.5 weight percent based on the total weight of the composition.

12. The composition of claim 11 wherein the mixed metal layered hydroxide constitutes at least about 0.5 weight percent based on the total weight of the composition and no more than about 5.0 weight percent based on the total weight of the composition.

13. The composition of claim 1 wherein the cement is a Portland cement.

* * * * *

UNITED STATES PATENT AND TRADEMARK OFFICE
CERTIFICATE OF CORRECTION

PATENT NO. : 4,822,421

DATED : April 18, 1989

INVENTOR(S) : Clarence R. Crabb

It is certified that error appears in the above-identified patent and that said Letters Patent is hereby corrected as shown below:

Col. 6, line 30, second line of Claim 10, that portion of the formula which reads "10.3" should read -- 0.3 --.

Signed and Sealed this

Tenth Day of July, 1990

*Attest:*

HARRY F. MANBECK, JR.

*Attesting Officer*      *Commissioner of Patents and Trademarks*